United States Patent                                    [11] 3,619,128

| [72] | Inventor | Richard L. Angstadt<br>Armonk, N.Y. |
|---|---|---|
| [21] | Appl. No. | 781,607 |
| [22] | Filed | Dec. 5, 1968 |
| [45] | Patented | Nov. 9, 1971 |
| [73] | Assignee | Stauffer Chemical Company<br>New York, N.Y. |

[54] METHOD FOR PROCESSING RARE EARTH FLUOROCARBONATE ORES
1 Claim, No Drawings

[52] U.S. Cl. .................................................... 23/18,
                                                        23/19, 23/183
[51] Int. Cl. .................................................... C22b 59/00
[50] Field of Search ........................................... 23/15, 18,
                                                        19, 183

[56] References Cited
UNITED STATES PATENTS
| 2,805,928 | 10/1957 | Kasey ........................... | 23/15 UX |
| 2,783,127 | 2/1957 | Rohden et al. ................ | 23/18 X |
| 2,815,264 | 12/1957 | Calkins et al. ................ | 23/18 X |
| 2,995,420 | 8/1961 | Duncan et al. ................ | 23/15 |
| 3,111,375 | 11/1963 | Gottdenker et al. ........... | 23/15 X |

OTHER REFERENCES

Bauer et al., " Bureau of Mines, Report of Investigations 6381," Dept. of Interior, Bureau of Mines, 1964, pp. 1 to 7 and 14.

*Primary Examiner*—Herbert T. Carter
*Attorneys*—Paul J. Juettner, Wayne C. Jaeschke and Martin Goldwasser

ABSTRACT: Rare earth fluorocarbonate ore is processed by digesting the ore in concentrated aqueous alkaline solution at a temperature of between about 100° C. and about 150° C. followed by separating the rare earth mineral values from the digestion solution in the form of rare earth hydrous oxides. The hydrous oxides can be processed further by roasting so as to facilitate removal of the noncerium oxides from the cerium values by a leaching process.

METHOD FOR PROCESSING RARE EARTH FLUOROCARBONATE ORES

The present invention relates to an improved method for processing rare earth fluorocarbonate ores, particularly of the bastnasite type, by caustic digestion.

In an United States Bureau of Mines Report of Investigations RI 6381 entitled "Metathesis of Bastnasite and Solvent Extraction of Cerium" (1964), it is taught that bastnasite ore can be processed by caustic digestion at elevated temperatures within the range 180° to 200° C. The suggested process involves admixing a saturated solution (50 percent by weight) of sodium hydroxide with the ore in an amount sufficient to provide about 1.5 grams of sodium hydroxide per gram of ore and heating the mixture for about 1 hour at a temperature of from 180° to 200° C. to yield hydroxides of the rare earths, fluoride ions, sodium ions, and, as an effluent, carbon dioxide. However, at these temperatures, it was indicated to be necessary to intermittently add water to the reaction mixture to maintain a constant volume and to prevent the product from becoming too dry and too thick to handle. The caustic digestion process as outlined in the Bureau of Mines Report has been found to proceed sporadically and the reaction mixture tends to bump and sputter extensively due to uncontrolled boiling. The need to add water to such a sputtering reaction mass is not desirable since such addition might cause the reaction vessel to explode and therefore this is an extremely dangerous process step.

It has now been found that these difficulties can be easily and economically overcome.

In accordance with the present invention, rare earth fluorocarbonate ores can be effectively processed by digesting the ore in a concentrated aqueous alkaline solution at a temperature within the range of from about 100° to about 150° C. The ore is effectively processed in a nonsputtering reaction below the boiling temperature of the mixture and there is no requirement that additional water be added during the digestion period. After the digestion, the mineral values can be separated from the digestion solution in the form of rare earth hydrous oxides. The cerium values can be separated from the remaining rare earth oxides by roasting the product to form the anhydrous oxides and cerium dioxide and the anhydrous oxides can then be separated from the cerium dioxide by a leaching process with an acid such as hydrochloric acid.

The rare earth fluorocarbonate ores which can be processed in accordance with the process of the present invention are those ores which, in pure form, can be designated by the general formula:

$$M \cdot CO_3 \cdot F$$

wherein M is a rare earth element of the lanthanide series (atomic numbers of from 57 to 71). These ores are generally found in combination with or associated with numerous gangue components such as calcite, barite, fluorspar, and witherite. A broad class of mineral ores of this type are the bastnasite ores which contain the requisite rare earth elements, the fluoride ion and the carbonate ion in various proportions in combination with various other gangue constituents. Closely related ores of the bastnasite type are ores such as parasite which contains calcium in addition to the rare earth elements and which has the general formula:

$$2McO_3 \cdot F \cdot CaCO_3$$

These ores can also be defluorinated by the process of the present invention. Preferably, the rare earth fluorocarbonate ore used in the present invention is bastnasite and the invention will be discussed hereinafter with regard to, but not limited to, bastnasite.

The bastnasite ore from the mines generally contains about 10 percent by weight rare earth oxides. Prior to processing the ore by digestion, it is preferable to dress the ore and concentrate the ore so as to provide a rare earth oxide concentrate having at least about 60 percent by weight rare earth oxides, and preferably, at least 70 percent by weight rare earth oxides. Any known concentration procedures can be utilized, such as by flotation, followed by countercurrent decantation leaching of the concentrate with 10 percent hydrochloric acid. While the ore is preferably concentrated prior to processing, unconcentrated ore can also be treated effectively in the methods of the present invention though this requires the handling of excessive amounts of gangue.

The ore concentrate is preferably crushed so as to provide a coarse feed mixture having particles varying in size from between about one-fourth to about 2¼ 1/4 inches. While ore particles of any size can be treated in accordance with the method of the present invention, coarse feed mixtures are preferred since excessive dusting is eliminated, the feed is easily handled, and the cost of fine crushing is avoided.

Inasmuch as any crushing will produce an ore mixture of various particle sizes, the ore is preferably washed and screened particularly to remove any undesirable fine particles of ore and any gangue.

The ore is then digested in a highly concentrated aqueous alkaline solution. The alkalinity can be provided by any one of a number of reagents which form highly alkaline solutions in water such as sodium hydroxide or potassium hydroxide. Preferably, the digesting solution is a sodium hydroxide solution and more preferably a saturated solution thereof, i.e., a solution containing approximately 50 percent by weight sodium hydroxide, the remainder being water. The ore is admixed with the alkaline solution and the admixture is subjected to elevated temperatures with the range of from about 100° to about 150° C. for a period of time sufficient to accomplish the digestion, generally from about 1 to about 3 hours. The reaction can be carried out in any apparatus which is designed to withstand the corrosive nature of the chemicals used in the reaction. The apparatus should also be provided with means to control the temperature of and agitate the reaction mixture during the digestion reaction.

The digestion is carried out using sufficient digestion solution to make a coarse slurry of the ore in the alkaline solution. Sufficient solution should be used so as to allow the admixture to be easily agitated during reaction. It has been found that about three parts of a 50 percent sodium hydroxide solution per part of ore is sufficient to provide the desired slurry. The use of substantial excesses of alkaline solution are uneconomical and the use of substantial deficiencies leads to processing difficulties.

The ore is digested at a temperature of from between about 100° C. and the initial boiling point of the digestion solution which for the preferred 50 percent sodium hydroxide solution is approximately 150° C. At temperatures above the initial boiling point, the solution begins to concentrate by the evaporation of water. Inasmuch as the boiling is difficult to control and is at times attendant with severe foaming, the temperature of the digestion mixture is preferably maintained slightly below the initial boiling point. For the preferred 50 percent sodium hydroxide digestion solution, the preferred digestion temperature is from about 130° to about 140° C.

The ore is rapidly digested and the rate of digestion is dependent on temperature. Longer digestion times are required at lower temperatures than at higher temperatures. At the preferred temperature range of 130° to 140° C., satisfactory digestions are accomplished in about 1 hour, though it is preferred to hold the ore at the desired digestion temperature for up to 3 hours to ensure completeness of digestion.

After digestion, the ore is separated from the alkaline solution by filtration, or any other suitable means for effecting such a solid-liquid separation. The filtration is facilitated by diluting the concentrated digestion solution with hot water. The residue is then, preferably, washed to remove any remaining traces of the digestion solution.

The residue of the filtration contains the rare earth mineral values, now in the form of the hydrous rare earth oxides. The residue can be used as such or processed further to separate the rare earth minerals into their individual entities. This is preferably accomplished by roasting the hydrous oxides at temperatures of from about 200° to about 700° for about 1-2 hours. The roasting conditions are such as to oxidize the cerium values to cerium dioxide so as to facilitate separation of the cerium values from the remainder of the rare earth values. It has also been found desirable to roast the hydrous oxides at a temperature sufficiently high to decompose any remaining fluorocarbonate ore as per the following reaction:

$$6MCO_3F \xrightarrow[\Delta]{air} M_2O_3 + 2CeO_2 + 2MF_3$$

This procedure cuts the potential loss of rare earth values by about two-thirds. The temperatures required to accomplish the decomposition are between about 500° and 700° C. Therefore, and to effect not only the decomposition but also the desired oxidation of the cerium values to cerium dioxide and the dehydration of the hydrous rare earth oxides, it is most preferred to utilize roasting temperatures of from about 600° to about 700° C.

After roasting, the cerium values are separated from the noncerium values by any known method. Particularly effective is the leaching of the noncerium values from the residue with an acid such as hydrochloric acid. Under proper conditions, noncerium rare earth oxides, $M_2O_3$, are soluble in hydrochloric acid, $CeO_2$ is only sparingly soluble in the absence of a reducing agent, and $MF_3$ is insoluble. Any of the known methods for separating out the individual rare earths can then be used to further refine the digested ore.

The invention is further illustrated in the example which follows.

EXAMPLE

In carrying out this example, the following procedure was utilized. A 50 percent sodium hydroxide solution was heated to 110° C. in a stainless steel beaker. 200 grams of a 70 percent rare earth concentrate containing about 35 percent $CeO_2$ and 35 percent $M_2O_3$ was then added. This reaction mixture was then heated to about 140° C. and the reaction mixture was held at the temperature under stirring. At the end of the digestion period, the reaction mixture was allowed to cool to about 90° C. It was then diluted with one liter of water (hot) and the resulting solution was filtered on a Büchner funnel. The residue was water washed and sucked dry on the funnel. The filtered residue was then roasted for about one-half hour, and the product was analyzed. The major crystalline phases in the product was identified by X-ray diffraction analysis. $CeO_2$ and $M_2O_3$ contents were determined by wet analysis. F was determined volumetrically in those cases where X-ray analysis showed no $MF_3$ or $MCO_3F$ to be present. The results are summarized in table I following.

TABLE I.—SUMMARY OF RESULTS OF NaOH DIGESTION REACTIONS

| Exp. | NaOH/RE conc. wt. ratio | Digestion Temp. | Digestion Time (hrs.) | Roasting Temp. (°C.) | Minor cryst. phases* | Percent recovery $M_2O_3$ | Percent recovery $CeO_2$ | Percent (RE) $F_3$ Total sample | Percent (RE) $F_3$ RE value |
|---|---|---|---|---|---|---|---|---|---|
| A | 1.5 | 140 | 2 | 650 | None | 97.3 | 99.3 | 1.4 | 1.4 |
| B | 1.5 | 140 | 1 | 200 | (RE)CO$_3$F | 98.3 | 100.6 | | |
| C | 2.0 | 140 | 1 | 200 | (RE)CO$_3$F | 98.0 | 99.9 | | |

*The major crystalline phase present in each case was a cubic $CeO_2(M_2O_3)$ phase.

Sample B was then leached with hydrochloric acid. Under proper conditions, noncerium values are soluble in hydrochloric acid, cerium dioxide only sparingly soluble and rare earth fluorides are insoluble. The results are presented in table II below.

TABLE II.—HCl LEACH OF THE RARE EARTH OXIDES

| Source of rare earth oxides | HCl Conc'n. (percent) | HCl Volume (ml.) | Reaction cond. Temp. (°C.) | Reaction cond. Time (hrs.) | Percent rare earth extracted $M_2O_3$ (noncerium) | Percent rare earth extracted $CeO_2$ |
|---|---|---|---|---|---|---|
| Exp. B* | 6 | 250 | 60 | 1 | 82.1 | 56.1 |
|  | 6 | 250 | 60 | 2 | 87.4 | 56.9 |

*Sample contained some HCl insoluble $MCO_3F$.

What is claimed is:

1. A method for processing bastnasite ore which comprises:
   a. digesting bastnasite ore in a saturated aqueous caustic solution containing at least 50 percent sodium hydroxide at a temperature of from 130° to 150° C. and below the boiling point of said solution, said sodium hydroxide being present in an amount sufficient to provide a ratio of sodium hydroxide to 70 percent ore concentrate of about 1.5 to 1;
   b. recovering from said digested solution the rare earth values of the ore substantially in the form of hydrous rare earth oxides;
   c. roasting said hydrous oxides at a temperature between 500° C. and 700° C. to convert the values of the rare earth cerium into cerium dioxide; and
   d. leaching the noncerium rare earth values from the roasted product with hydrochloric acid.

* * * * *